United States Patent
Chen et al.

(10) Patent No.: US 8,484,013 B2
(45) Date of Patent: Jul. 9, 2013

(54) INTERACTIVE CONVERSATION-LEARNING SYSTEM AND A METHOD THEREOF

(75) Inventors: Shing-Lung Chen, Kaohsiung (TW); Chen-Sung Chang, Nantou County (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 1227 days.

(21) Appl. No.: 12/332,435

(22) Filed: Dec. 11, 2008

(65) Prior Publication Data

US 2009/0228265 A1 Sep. 10, 2009

(30) Foreign Application Priority Data

Mar. 6, 2008 (TW) .............................. 97107921 A

(51) Int. Cl.
*G06F 17/27* (2006.01)
(52) U.S. Cl.
USPC .......................................................... 704/9
(58) Field of Classification Search
USPC .......................................................... 704/9
See application file for complete search history.

(56) References Cited

U.S. PATENT DOCUMENTS

| | | | | |
|---|---|---|---|---|
| 7,281,022 B2* | 10/2007 | Gruhl et al. | ............................ | 1/1 |
| 7,949,531 B2* | 5/2011 | Huang et al. | ................... | 704/270 |
| 2003/0105636 A1* | 6/2003 | Wen et al. | ...................... | 704/270 |
| 2003/0191627 A1* | 10/2003 | Au | ..................................... | 704/9 |
| 2004/0015344 A1* | 1/2004 | Shimomura et al. | ........... | 704/200 |
| 2004/0214145 A1* | 10/2004 | Wen et al. | ...................... | 434/167 |
| 2007/0094005 A1* | 4/2007 | Huang et al. | ....................... | 704/3 |
| 2009/0076795 A1* | 3/2009 | Bangalore et al. | ................ | 704/9 |

OTHER PUBLICATIONS

Roy et al. ("Automatic Generation of Domain Models for Call Centers from Noisy Transcriptions", Proceedings of the 21st International Conference on Computational Linguistics and 44th Annual Meeting of the ACL, pp. 737-744, Jul. 2006).*

* cited by examiner

*Primary Examiner* — Samuel G Neway
(74) *Attorney, Agent, or Firm* — Alan Kamrath; Kamrath IP Lawfirm, P.A.

(57) ABSTRACT

A method of an interactive conversation-learning system includes the steps of: selecting at least one conversation topic provided with at least one conversation target and a plurality of conversation sentences; inputting a first conversation sentence into the interactive conversation-learning system; defining at least one conversation route according to the first conversation sentence, and providing a correlation among the conversation target, the conversation sentences and the conversation route to form a relationship model; and outputting a second conversation sentence connecting with the first conversation sentence via the designated conversation route. Accordingly, the interactive conversation-learning system of a preferred embodiment is provided with a plurality of relationship models.

1 Claim, 1 Drawing Sheet

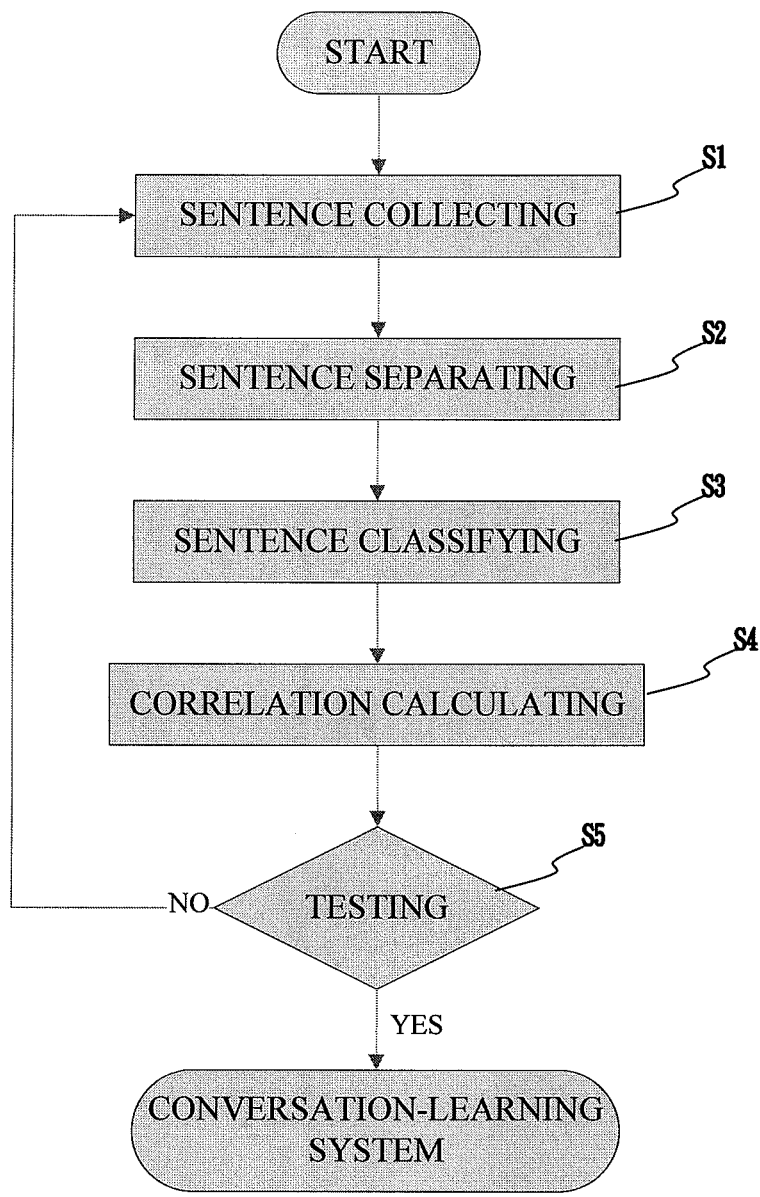

INTERACTIVE CONVERSATION-LEARNING SYSTEM AND A METHOD THEREOF

BACKGROUND OF THE INVENTION

1. Field of the Invention

The present invention relates to an interactive conversation-learning system and a method thereof. More particularly, the present invention relates to the interactive conversation-learning system and the method thereof utilizing a plurality of conversation routes to connect sentence patterns for use in conversation learning or training.

2. Description of the Related Art

Currently, English is a commonly used language all over the world. With the coming of the age of globalization, it is important for non-English speakers to have good abilities of speaking and listening in English. However, speaking, listening, reading and writing are the most important skills in learning a foreign language.

In foreign-language training, there is a need of providing a digital language-learning system as an auxiliary tool. However, the digital foreign-language-learning system focuses on vocabularies, pronunciations and grammars that cannot imitate conversations to utilize the foreign language in real-life situations.

Currently, a foreign-language-conversation software is designed by the contents of conversation textbooks, including standardized dialogues, standardized sentence structures and standardized vocabularies which limit the conversation training within standardized situations. Thus, by way of example, the foreign-language-conversation software will provide a standardized question sentence: "What time is it?" and will request a standardized answer sentence: "It's seven." Accordingly, the trainees must follow and read the standardized answer sentence, such that the software can evaluate the trainee's answer in the computer system.

Such foreign-language-conversation software during use has some drawbacks as follows:

1. The sentence structures for use in conversation training are standardized and limited within a predetermined set, such that the scopes of conversation topics cannot be broadened, and such that some other types or combinations of the sentence structures cannot be possible to practice. For example, in the conversation training of a shopping topic, the sentence structures may be focused on standardized issues of choosing an article, inquiring of price and making a decision, and may lack the issues of negotiating a price or payment.

2. The foreign-language-conversation software provided with a number of standardized sentence structures lacks correlations between different sentences and cannot imitate various logically thinking conversation situations.

3. The foreign-language-conversation software can be only used to recognize and evaluate the trainees' responses according to their pronunciations, grammars and vocabularies. Disadvantageously, the conventional foreign-language-conversation software cannot be used to recognize the completeness of different conversation steps in the foreign-language training.

As is described in greater detail below, the present invention provides an interactive conversation-learning system and a method thereof in such a way as to mitigate and overcome the above problem.

SUMMARY OF THE INVENTION

The primary objective of this invention is to provide an interactive conversation-learning system and a method thereof utilizing a plurality of conversation routes to connect sentence patterns. The conversation routes are used to guide a conversation-training procedure to a conversation target. Accordingly, the present invention is successful in training and learning a foreign language step by step.

The method of the interactive conversation-learning system in accordance with an aspect of the present invention includes the steps of:

selecting at least one conversation topic provided with at least one conversation target and a plurality of conversation sentences;

inputting a first conversation sentence into the interactive conversation-learning system;

defining at least one conversation route according to the first conversation sentence, and providing a correlation among the conversation target, the conversation sentences and the conversation route to form a relationship model; and outputting a second conversation sentence connecting with the first conversation sentence via the designated conversation route.

The interactive conversation-learning system in accordance with an aspect of the present invention includes:

at least one conversation topic provided with at least one conversation target and a plurality of conversation sentences; and at least one relationship model formed with the conversation target, the conversation sentences and at least one conversation route;

wherein a correlation exists among the conversation target, the conversation sentences and the conversation routes; and wherein the conversation routes connects among the conversation sentences.

In a separate aspect of the present invention, the conversation routes are used to determine a plurality of conversation steps.

In a further separate aspect of the present invention, the conversation sentences include at least one question sentence and at least one answer sentence.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a flow chart of an establishing method of an interactive conversation-learning system in accordance with a preferred embodiment of the present invention.

DETAILED DESCRIPTION OF THE INVENTION

It is noted that an interactive conversation-learning system of the present invention can be implemented on a variety of different computing equipment, including stand-alone personal computers, networked computers, laptop computers, workstations, or the like. An establishing method for the interactive conversation-learning system of the present invention can be formed with computer-executable process steps.

The method for interactive conversation learning in accordance with a preferred embodiment of the present invention includes the steps of:

Step 1: Trainees or users select at least one conversation topic which is provided with at least one conversation target and a plurality of conversation sentences. Preferably, the conversation topics provided in an interactive conversation-learning system in accordance with the present invention can be any topic suitable for imitating real-life conversation.

Step 2: Trainees or users input a first conversation sentence into the interactive conversation-learning system. Preferably, the first conversation sentence is selected from a question sentence corresponding to at least one answer sentence.

Step 3: The interactive conversation-learning system can be automatically executed to identify an input of the first conversation sentence, and to define at least one conversation route according to the first conversation sentence. Accordingly, one of the conversation routes is designated and generated. In this regard, the designated conversation route directs to at least one of the next conversation routes or the conversation targets. A correlation exists among the conversation target, the conversation sentences and the conversation route which form a relationship model. In this manner, the conversation routes connect among the conversation sentences to determine conversation steps in conversation training.

Step 4: The interactive conversation-learning system can be automatically executed to output a second conversation sentence. The second conversation sentence connects with the first conversation sentence via the designated conversation route. Once the second conversation sentence is generated in the interactive conversation-learning system, trainees can repeat Steps 2 through 4 to continuously conduct the conversation-learning procedure step by step.

Finally, the interactive conversation-learning system can automatically output a message which appears arriving at the conversation target and terminating the conversation-learning procedure.

Once the interactive conversation-learning system is terminated, trainees can repeat Steps 1 through 4 to further conduct a new conversation-learning procedure step by step if necessary.

The interactive conversation-learning system in accordance with an aspect of the present invention includes at least one conversation topic and at least one relationship model. The conversation topic can be any topic suitable for imitating a real-life conversation. The conversation topic is provided with at least one conversation target and a plurality of conversation sentences. The relationship model is formed with the conversation target, at least one conversation route and the conversation sentences. A correlation exists among the conversation target, the conversation sentences and the conversation routes, and the conversation routes connect among the conversation sentences.

In a preferred embodiment of the present invention, the conversation routes are used to determine a plurality of conversation steps.

In another preferred embodiment of the present invention, the conversation sentences include at least one question sentence and at least one answer sentence.

Referring now to FIG. 1, the establishing method for the interactive conversation-learning system in accordance with a preferred embodiment of the present invention includes the steps of:

Step A. Building database: At least one conversation topic containing at least one conversation target is designated and stored in a SQL database to build the content of the conversation-learning database. In a preferred embodiment, the conversation topics are stored as conversation data in the SQL database to form the content of the conversation-learning database.

Step B. Sentence-separating: Sentence separation software (e.g. The Trados translation software) is used to separate a series of sentences (i.e. conversation data) along punctuation marks to generate a set of separated sentences. Preferably, the punctuation marks may be of Chinese punctuation marks or English punctuation marks.

Step C. Classifying conversation route: Various conversation sentences including question sentences and answer sentences are classified and assigned to different conversation routes according to the conversation targets. Furthermore, correlations among the conversation targets, the conversation routes and the conversation sentences are calculated in the next step. In a preferred embodiment, the conversation targets and the conversation routes are manually or automatically classified. Example 1: the conversation sentences (What products do you have?), (Do you sell some pears?) and (Where do you put the pears?) can be directed to the conversation target of "shopping" and arranged to the conversation route of "confirming product". Example 2: the conversation sentences (How expensive is it?), (How much is it?) and (How much money is it for each?) can be directed to the conversation target of "shopping" and arranged to the conversation route of "confirming price."

Step D. Calculating relationship correlations: The correlation among a single conversation target, a single conversation route and the related conversation sentences are calculated and connected to form a relationship model. The conversation-learning database contains an adequate number of the relationship models such that the interactive conversation-learning system of the present invention is accomplished. In operation, the interactive conversation-learning system can guide a trainee along a suitable set of the conversation routes to arrive at the conversation target.

The interactive conversation-learning system in accordance with an aspect of the present invention is provided with a plurality of the relationship models. The conversation topics and the related conversation targets can be selected to determine the corresponding conversation routes which connect to the conversation targets. Accordingly, users can select one of the conversation sentences, according to their logical thinking, in response to the interactive conversation-learning system. In this manner, the interactive conversation-learning system can compute the received conversation sentence to determine a next conversation step with a new conversation sentence in response to the user. Alternatively, the interactive conversation-learning system can also compute the received conversation sentence to determine a message arriving at the conversation target.

Preferably, the conversation topics include "shopping," "remittance," "ordering meal," and "car rental." The designated conversation topic has several conversation steps along the corresponding conversation routes. For example, once the conversation topic of "room reservation" is selected, the conversation routes include "requesting an available room," "choosing a room type," "confirming room price," "deciding check-in" and "making payment" which may repeatedly form the conversation steps.

For example, in the conversation route of "requesting an available room," the types of the predetermined conversation sentences selected by users may be as follows: (Would you offer an available room?), (Do you have any available room?), (How many available rooms do you have?), etc. Consequently, users can select at least three types of the conversation sentences in the conversation route of "requesting an available room" rather than a single conversation sentence previously designated in the system.

Referring now to FIG. 1, a flow chart of an establishing method of the interactive conversation-learning system in accordance with a preferred embodiment of the present invention is shown. The establishing method of the present invention includes, by way of example, the steps of:

1. Sentence collecting (identified as step S1): collecting the conversation sentences according to the conversation topics, wherein documents of the conversation sentences may be converted into digital conversation sentences by computer software such as Optical Character Recognition software and stored in the database;
2. Sentence separating (identified as step S2): using computer software such as Trados translation software to separate the sentences at their punctuation marks if the different conversation sentences are found in a single string of the conversation sentences;
3. Sentence Classifying (identified as step S3): classifying the conversation sentences according to the conversation targets, assigning the similar conversation sentences to the same conversation route, and preferably processing these conversation sentences by Data Mining technology;
4. Correlation calculating (identified as step S4): using statistical software to calculate the correlations among the conversation targets, the conversation routes and the conversation sentences to form a plurality of relationship models so that each of the conversation topics corresponds to at least one of the relationship models; and
5. Testing (identified as step S5): selecting one of the conversation topics for testing the relationship model to see if the interactive conversation-learning system is successfully executed. The interactive conversation-learning system is successful if a conversation-learning procedure can start from a particular conversation target, travel a series of the conversation routes step by step, and finally arrive at the conversation target.

Steps S1 through S5 must be repeatedly executed to complete the interactive conversation-learning system in accordance with the preferred embodiment of the present invention until passing the test.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An establishing method for an interactive conversation-learning system comprising:
   collecting digital conversation sentences according to conversation topics in computing equipment, wherein documents of conversation sentences are converted into the digital conversation sentences by Optical Character Recognition software and stored in a database in the computing equipment;
   using Trados translation software to separate the digital conversation sentences at punctuation marks if different conversation sentences are found in a single string of the digital conversation sentences;
   classifying the different conversation sentences according to conversation targets, assigning similar conversation sentences of the different conversation sentences to a conversation route, and processing similar conversation sentences and the different conversation sentences by Data Mining technology;
   using statistical software to calculate correlations among the conversation targets, the conversation route and the digital conversation sentences to form a plurality of relationship models, wherein each conversation topic corresponds to at least one of the plurality of relationship models; and
   selecting one of the conversation topics for testing one of the plurality of relationship models to see if a conversation-learning procedure starts from a particular conversation target, travels a series of conversation routes step by step, and finally arrives at the conversation target.

* * * * *